UNITED STATES PATENT OFFICE.

CHIKAKIYO HONDA, OF TOKYO, JAPAN.

METHOD OF MAKING PAVING MATERIAL FROM TARRY MATTER.

1,386,932.     Specification of Letters Patent.     Patented Aug. 9, 1921.

No Drawing.     Application filed October 30, 1919. Serial No. 334,447.

*To all whom it may concern:*

Be it known that I, CHIKAKIYO HONDA, a subject of the Empire of Japan, residing at No. 5 Nichome, Motozonocho, Kojimachi-ku, Tokyo, Japan, have invented certain new and useful Improvements in Methods of Making Paving Material from Tarry Matter, of which the following is a specification.

This invention relates to the manufacture of paving materials from tarry matter.

The object of my invention is to produce a paving material which is applicable as an asphalt substitute and which penetrates easily into the earth, solidifies rapidly, is waterproof, and is unaffected by atmospheric temperature changes.

The present invention consists in manufacturing a paving material by mixing tarry matter together with table salt, rosin saponified with slaked lime, and rosin sulfureted with sulfur powder, to which mixture clay may be added, if desired.

The following example describes a method of carrying out my invention but it is to be understood that I do not limit myself to the exact quantities stated nor to the precise procedure indicated.

First heat 40 gallons of coal tar in a metallic vessel at a temperature of about 120° C., drive off the moisture, and add gradually from 20 to 30 lbs. of table salt (NaCl). After continuous heating the whole mass becomes pasty like gluten and this mass will be hereinafter referred to as the tarry matter. Next fuse 50 lbs. of rosin in another vessel add 7 lbs. of slaked lime ($Ca(OH)_2$) and also 7 lbs. of sulfur powder. In this case, part of the rosin will be saponified by the slaked lime and part sulfureted by the sulfur. The compound thus obtained, is added gradually into the tarry matter hereinbefore described, and both mixed together thoroughly while being heated. To this mixture add 8 gallons of clay in a semi-liquid condition and a homogeneous paving material is obtained.

Table salt increases the viscosity of the coal tar and improves its impregnating and solidifying power. The slaked lime produces rosin soap with rosin which acts as a binding material while the sulfureted rosin protects the surface laid from being affected by temperature changes. Moreover by the method aforesaid a very rigid road surface will be easily produced.

I claim:

1. The method of manufacturing a paving material which consists in mixing tarry matter together with table salt (NaCl), rosin saponified with slaked lime ($Ca(OH)_2$), and rosin which is sulfureted with sulfur powder.

2. In the method of manufacturing a paving material as claimed in claim 1 the addition of clay to the mixture.

In testimony whereof I affix my signature in presence of two witnesses.

CHIKAKIYO HONDA. [L. S.]

Witnesses:
    KEIICHI KAJIMA,
    HENRY B. HITCHCOCK.